United States Patent [19]

Summers et al.

[11] Patent Number: 5,178,649
[45] Date of Patent: Jan. 12, 1993

[54] POLY(ARYLENE ETHER KETIMINE) GAS SEPARATION MEMBRANES

[75] Inventors: John D. Summers, Philadelphia, Pa.; Edgar S. Sanders, Jr., Pittsburg, Calif.

[73] Assignee: The Dow Chemical Company, Midland, Mich.

[21] Appl. No.: 454,791

[22] Filed: Dec. 21, 1989

[51] Int. Cl.$^5$ .................. B01D 53/22; B01D 71/38
[52] U.S. Cl. ............................................. 55/16; 55/68; 55/70; 55/73
[58] Field of Search .................. 55/16, 68, 158, 70, 55/73

[56] References Cited

U.S. PATENT DOCUMENTS

| | | |
|---|---|---|
| 4,086,209 | 4/1978 | Hara et al. |
| 4,440,643 | 4/1984 | Makino et al. .................. 55/158 X |
| 4,512,893 | 4/1985 | Makino et al. .................. 55/158 X |
| 4,528,004 | 7/1985 | Makino et al. .................. 55/158 |
| 4,647,297 | 3/1987 | Zampini ........................... 55/158 |
| 4,717,393 | 1/1988 | Hayes ............................. 55/158 X |
| 4,832,713 | 5/1989 | Yamada et al. ................. 55/158 |
| 4,855,500 | 8/1989 | Spavins .......................... 564/270 |

FOREIGN PATENT DOCUMENTS

| | | |
|---|---|---|
| 0113574 | 7/1984 | European Pat. Off. ............. 55/158 |
| 227299 | 12/1985 | European Pat. Off. |
| 60-075307 | 11/1977 | Japan. |
| 61-107923 | 5/1986 | Japan .................. 55/158 |
| 61-133118 | 6/1986 | Japan .................. 55/158 |

OTHER PUBLICATIONS

Mohanty et al., "Ketimine Modifications as a Route to Novel Amorphous and Derived Semicrystalline Poly-(Arylene Ether Ketone) Homo- and Copolymers", *32nd International SAMPE Symposium*, Apr. 6-9, 1987, pp. 408-419.

Mohanty et al., "Synthesis and Characterization of Ketimine Functional Poly(Ether Ether) Ketone Networks", *Polymer Preprints*, 29(1), 1988, pp. 352-353.

Senger et al., "Synthesis and Physical Behavior and Ketimine Modified Poly(Arylene Ether) Networks", *Polymer Preprints*, 29(1), 1988, pp. 358-359.

*Primary Examiner*—Robert Spitzer
*Attorney, Agent, or Firm*—Janet Pauline Clark

[57] ABSTRACT

This invention relates to novel poly(arylene ether ketimine) gas separation membranes and a process for separating gases using such membranes.

4 Claims, No Drawings

POLY(ARYLENE ETHER KETIMINE) GAS SEPARATION MEMBRANES

BACKGROUND OF THE INVENTION

This invention relates to novel poly(arylene ether ketimine) gas separation membranes. This invention further relates to a process of separating gases using said membranes.

Membranes have been used to recover or isolate a variety of gases, including hydrogen, helium, oxygen, nitrogen, carbon monoxide, carbon dioxide, water vapor, hydrogen sulfide, ammonia, and/or light hydrocarbons. Applications of particular interest include the separation of hydrogen or helium from gas mixtures such as gas mixtures containing nitrogen, carbon monoxide, carbon dioxide, water vapor, and/or light hydrocarbons, For example, the separation and recycle of hydrogen is often necessary in various hydrocracker, hydrotreater, and catalytic cracking processes used in the oil refinery industry. Membranes can also be used to achieve the separation of carbon monoxide and/or carbon dioxide from light hydrocarbons such as methane. Other applications of interest include the separation of air into an enriched oxygen stream, which is useful for fermentation and enhanced combustion processes, and an enriched nitrogen stream, which is useful for inert padding of flammable fluid or for food storage.

Such membrane separations are based on the relative permeability of two or more gaseous components through the membrane. To separate a gas mixture into two portions, one richer and one leaner in at least one gaseous component, the mixture is brought into contact with one side of a semi-permeable membrane through which at least one of the gaseous components selectively permeates. A gaseous component which selectively permeates through the membrane passes through the membrane more rapidly than at least one other gaseous component of the gas mixture. The gas mixture is thereby separated into a stream which is enriched in the selectively permeating gaseous component or components and a steam which is depleted in the selectively permeating gaseous component or components. A relatively non-permeating gaseous component passes more slowly through the membrane than at least one other gaseous component of the gas mixture. An appropriate membrane material is chosen for the gas mixture so that some degree of separation of the gas mixture can be achieved.

Membranes for gas separation have been fabricated from a wide variety of polymeric materials, including cellulose esters, aromatic polyimides, polyaramides, polysulfones, polyethersulfones, polyesters, and polycarbonates. An ideal gas separation membrane is characterized by the ability to operate under high temperature and/or pressure while possessing a high gas separation factor (selectivity) and high gas permeability. Gas separation membranes also are preferably fabricated from polymers which are easily processed. The problem is finding membrane materials which possess all the desired characteristics. Polymers possessing high gas separation factors generally have low gas permeabilities. While those polymers possessing high gas permeabilities generally have low gas separation factors. In the past, a choice between a high gas separation factor and a high gas permeability has been unavoidably necessary. Furthermore, some of the polymeric membrane materials previously used suffer from the disadvantage of poor performance under high operating temperatures and pressures. However, those polymeric membrane materials capable of operating at high temperature and pressures are typically difficult to fabricate into membranes. A membrane capable of separating gas mixtures which possesses high gas selectively, high gas permeability, ability to operate under extreme conditions of temperatures and pressure, and ease of fabrication is needed.

SUMMARY OF THE INVENTION

The invention is a semi-permeable gas separation membrane comprising a thin discriminating layer of poly(arylether ketimine).

In another aspect, the invention is a process of separating gases comprising:

A. contacting one side of a semi-permeable gas separation membrane with a feed gas mixture under pressure, wherein the membrane separates a higher pressure region on one side of the membrane into which the feed gas mixture is fed from a lower pressure region on the other side of the membrane;

B. maintaining a pressure differential across the membrane under conditions such that at least one gaseous component in the feed gas mixture selectively permeates through the membrane from the higher pressure region to the lower pressure region;

C. removing from the lower pressure region permeated gas which is enriched in the selectively permeating gaseous component(s); and D. removing from the higher pressure region non-permeated gas which is depleted in the selectively permeating gaseous component(s);

wherein the membrane comprises a thin discriminating layer of poly(arylene ether ketimine).

The poly(arylene ether ketimine) membranes of this invention possess high as selectivities and high gas permeabilities. The membranes are easily fabricated and may be operated at high temperatures and high pressures.

DETAILED DESCRIPTION OF THE INVENTION

The membranes of this invention are fabricated from poly(arylene ether ketimine). The poly(arylene ether ketimines)useful int his invention are substantially derived from ketimine and bisphenol.

The membranes of this invention preferably comprise a thin discriminating layer of a poly(arylene ether ketimine) comprising repeat units of the formula:

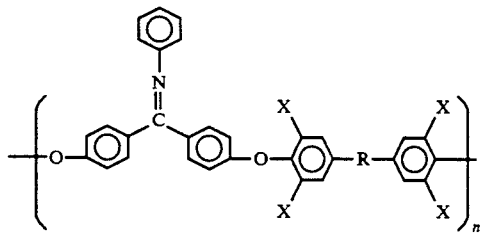

wherein
R is —, —SO$_2$—, —CO—, —O—, a C$_{1-6}$ divalent hydrocarbon radical, a C$_{1-6}$ divalent halogenated hydrocarbon radical, or an inertyl substituted C$_{1-6}$ divalent hydrocarbon radical;

X at each occurrence is independently hydrogen, chlorine, bromine, fluorine, or $C_{1-4}$ alkyl; and n is a positive real number such that the poly(arylene ether ketimine) posses a molecular weight suitable for forming a membrane therefrom.

Preferably, R is a $C_{1-6}$ divalent hydrocarbon radical, a $C_{1-6}$ divalent halogenated hydrocarbon radical, r an inertly substituted $C_{1-6}$ divalent hydrocarbon radical; more preferably r is a $C_{1-6}$ divalent hydrocarbon radical; even more preferably R is a $C_{1-6}$ alkylidene radical, especially a propylidene radical. When R is a $C_{1-6}$ divalent halogenated hydrocarbon radical, the halo-substituent is preferably bromine, chlorine, or fluorine, more preferably bromine or chlorine.

X at each occurrence is independently preferably chlorine, bromine, fluorine, or a $C_{1-4}$ alkyl; more preferably chlorine, fluorine, methyl, ethyl, or propyl; even more preferably chlorine, methyl, or ethyl.

n is preferably a positive real number of about 50 or greater, more preferably of about 65 or greater.

The poly(arylene ether ketimines) useful in this invention include copolymers and physical blends of the poly(arylene ether ketimines) disclosed herein. Such poly(arylene ether ketimines) may be prepared from ketimine and the appropriate bisphenol(s). Ketimine and the bisphenols useful for preparing the poly(arylene ether ketimines) useful in this invention are generally commercially available or readily prepared by conventional synthesis techniques. See, for example, U.S. Pat. No. 4,855,500; Mohanty et al., "Ketimine Modifications as a Route to Novel Amorphous and Derived Semicrystalline Poly(Arylene Ether Ketone) Homo- and Copolymers," 32nd International SAMPE Symposium, Apr. 6–9, 1987, pp. 408–419; Mohanty et al., "Synthesis and Characterization of Ketimine Functional Poly(Ether Ether) Ketone Networks," *Polymer Preprints*, 29(1), 1988, pp. 352–353; and Senger et al., "Synthesis and Physical Behavior of Ketimine Modified Poly(Arylene Ether) Networks," *Polymer Preprints*, 29(1), 1988, pp. 358–359; the relevant portions incorporated herein by reference. Such poly(arylene ether ketimines) are generally soluble in dipolar aprotic solvents such as tetrahydrofuran, N-methyl-2-pyrrolidinone, dimethylformamide, dimethylsulfoxide, and dimethylacetamide.

The membranes of this invention can take any form known to one skilled in the art. The membranes may be in the form of films tubes, or hollow fibers. Also, the membranes may be homogeneous membranes, composite membranes, or asymmetric membranes. Asymmetric and composite membranes are preferred; asymmetric membranes are more preferred.

Homogeneous membranes are prepared by forming a thin discriminating layer which is dense and free of voids and pores. Such membranes possess a discriminating layer which generally has the same structure and composition throughout the membranes. In one preferred embodiment, the poly(arylene ether ketimines) useful in this invention are dissolved in a solvent, thus forming a polymer/solvent solution which is cast onto a uniform surface from which the membrane may thereafter be readily separated. Preferred casting solvents for the poly(arylene ether ketimines) of this invention include dipolar aprotic solvents such as N-methyl-2-pyrrolidinone, dimethylacetamide, and tetrahydrofuran; more preferred solvents include N-methyl-2-pyrrolidinone and tetrahydrofuran. The polymer/solvent solution should be homogeneous and possess sufficient viscosity to allow casting of the solution onto a uniform surface. Preferably, the solution of polymer/solvent contains polymer in weight percents of between about 2 and about 40, more preferably of between about 5 and about 20, even more preferably of between about 5 and about 15.

The solution is cast onto a uniform surface possessing a low surface energy such as silicone or coated glass, or a surface to which the membrane will not adhere such as mercury, or a liquid with which the polymer is substantially immiscible such as water. Alternately, the membrane may be cast onto a surface which may be dissolved away from the membrane following curing and drying. Casting is performed by pouring the solution onto the appropriate surface and using an appropriate tool to form a film of the appropriate thickness. A continuous casting process may be achieved by casting the solution onto endless belts or rotating drums. Thereafter, the cast solution is exposed to curing or drying conditions. Such conditions are used to substantially remove the solvent, thereby laving a thin discriminating layer of polymer which is homogeneous. The solution may be cured or dried either by exposure to a vacuum, exposure to elevated temperatures, by allowing the solvent to evaporate over time, or any combination thereof. Generally, it is preferable to expose the cast solution to elevate temperatures, preferably less than about 150° C., more preferably less than about 100° C.

Composite membranes are prepared by forming a thin discriminating layer on a porous supporting layer. Such membranes possess a discriminating layer which generally has a different structure and composition than the porous supporting layer. To prepare a composite membrane, a homogeneous discriminating layer can be formed and thereafter adhered to a porous supporting layer. Alternatively, the porous supporting layer can be the surface upon which the discriminating layer is cast. In such an embodiment, the composite membrane is prepared by casting a solution as a coating on the porous support. Penetration of the polymer from which the discriminating layer is formed into the pores of the porous supporting layer is acceptable so long as the desired thickness of the membrane is not exceeded. The porous supporting layer is characterized in that it preferably does not significantly impede the transport of gas through the membrane. In one embodiment, the porous supporting layer can be a metal or polymeric plate with a plurality of holes drilled through it. However, such a drilled plate is not advantageous because it may significantly reduce the effective area of the membrane. In a preferred embodiment, the porous supporting layer is a porous polymeric membrane. Suitable porous polymeric membrane materials include polyolefins, polystyrenes, polyetheretherketones, polyetherketones, polyimides, polycarbonates, polysulfones, polyphenylene sulfides, polyesters, cellulose esters, cellulose ethers, polyethersulfones, and the like. Examples of such porous polymeric membranes suitable as porous supporting layers in composite membranes include porous cellulose esters and polysulfone porous membranes commercially available under the trade names MILLIPORE, PELLICONE, and DIAFLOW. Where such porous supporting membranes are thin or highly deformable, a frame or screen may also be used to adequately support the membrane. In one especially preferred embodiment, the porous polymeric supporting layer is a hollow fiber of a porous polymeric membrane such as a microporous polysulfone hollow fiber membrane. The hollow fiber itself provides adequate support for the discriminating layer coated on the inside or the outside surface of the hollow fiber. After the solution is cast onto the porous supporting layer to form the thin discriminating layer, the membrane is then exposed to curing or drying conditions to substantially remove solvent from the discriminating layer such as described hereinbefore for the formation of homogeneous membranes.

Asymmetric membranes are prepared by forming a thin discriminating layer on a porous supporting layer. Such membranes possess a discriminating layer which generally has the same composition but a different structure than the porous supporting layer. To prepare an asymmetric membrane, a solution of polymer, solvent, and optional non-solvent is formed and cast as hereinbefore described for homogeneous membranes. The cast solution is partially cured to remove a portion of the solvent. Thereafter, one or both surfaces of the partially cured membrane is contacted with a non-solvent for the polymer such as water so as to form a thin discriminating layer on one or both sides of the membrane while substantially removing the solvent and optional non-solvent. The porous supporting layer formed provides support for the thin discriminating layer without significantly impeding the transport of gas through the membrane. The drying step is preformed in a manner similar to that described hereinbefore with respect to the formation of homogeneous membranes.

Film and hollow fiber membranes which are homogeneous, composite, or asymmetric may be formed by extrusion from an appropriate solution of the polymer in a solvent and optional non-solvent. Such extrusion processes are well known to those skilled in the art and the formation of such membranes requires the adaptation of the hereinbefore described techniques.

Extrusion is the preferred process for the fabrication of film, tubular, or hollow fiber membranes. In the case of extrusion, the components of the extrusion mixture may be combined prior to extrusion by mixing in any convenient manner with conventional mixing equipment, as for example in a Hobart mixer or a resin kettle. Alternately, the extrusion mixture may be homogenized by extruding the mixture through a twin screw extruder, cooling the extrudate, and grinding or pelletizing the extrudate to a particle size readily fed to a single or twin screw extruder. The components of the extrusion mixture may also be combined directly in a meltpot or twin screw extruder and extruded into membranes in a single step.

The polymer, solvent, and optional non-solvent mixture is heated to a temperature at which the mixture becomes a homogeneous fluid. The homogeneous fluid is then extruded through a film or hollow fiber die (spinnerette). Hollow fiber spinnerettes are typically multi-holed and thus produce a tow of multiple hollow fibers. The hollow fiber spinnerettes include a means for supplying fluid to the core of the extrudate. The core fluid is used to prevent collapse of the hollow fibers as they exit the spinnerette. The core fluid may be a gas such as nitrogen, air, carbon dioxide, or other inert gas, or a liquid which is a non-solvent for the polymer such as water. Following extrusion, the membrane is treated as hereinbefore described for homogeneous, composite, or asymmetric membranes.

Preferably, the homogeneous membranes useful in this invention have a thickness of between about 1 and about 50 microns, more preferably between about 1 and about 20 microns, even more preferably between about 1 and about 10 microns. Hollow fiber homogeneous membranes preferably have an outer diameter of between about 20 and about 200 microns, more preferably between about 20 and about 100 microns, even more preferably between about 20 and about 50 microns. Preferably, the discriminating layer in composite or asymmetric membranes possesses a thickness of between about 0.02 and about 10 microns, more preferably between about 0.02 and about 2 microns. Preferably, the supporting layer in composite or asymmetric membranes possesses a thickness of between about 5 and about 100 microns, more preferably between about 5 and about 50 microns, even more preferably between about 5 ad about 30 microns. Hollow fiber composite or asymmetric membranes preferably have an outer diameter in the range of from about 50 to about 500 microns, more preferably in the range of from about 50 to about 400 microns, even more preferably in the range of from about 100 to about 300 microns.

The membranes may be fabricated into plate and frame, spiral wound, tubular, or hollow fiber devices by methods known in the art. See for example U.S. Pat. Nos. 3,228,876; 3,433,008; 3,455,460; 3,475,311; 3,526,001; 3,538,553; 3,690,465; 3,702,658; 3,755,034; 3,801,401; 3,872,014; 3,966,616; 4,045,851; 4,061,574; 4,080,296; 4,083,780; 4,220,535; 4,235,723; 4,265,763; 4,430,219; 4,352,092; 4,337,139; 4,315,819; and U.S. patent application Ser. No. 309,756, filed Feb. 9, 1989, now U.S. Pat. No. 4,929,259, and Ser. No. 429,928, filed Oct. 30, 1989, now U.S. Pat. No. 4,961,762; the relevant portions of all patents and applications incorporated herein by reference for all legal purposes served thereby. The membranes are generally sealingly mounted in a pressure vessel in such a manner that the membrane separates the vessel into two fluid regions wherein fluid flow between the two regions is accomplished by fluid permeating through the membranes. Under certain condition, it may be highly desirable to provide support for the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the art. The membrane affixed to the frame can then be sealingly engaged in the conventional manner in a vessel so that the membrane surface inside the framing support separates two otherwise non-communicating regions in the vessel. One skilled in the art will recognize that the structure which supports the membrane can be an internal part of the vessel or even the outer edge of the membrane.

The membrane separates a higher pressure region on one side of the membrane into which the feed gas mixture is introduced from a lower pressure region on the other side of the membrane. The membrane is contacted with a feed gas mixture under pressure, while a pressure differential is maintained across the membrane. In the embodiment wherein the membrane is in hollow fiber form, the feed gas mixture may be introduced on the outside or the inside of the hollow fiber. At least one gaseous component in the feed gas mixture selectively permeates through the membrane more rapidly than the other gaseous component(s) in the gas mixture. Gas which is enriched in the selectively permeating gaseous component(s) is thus obtained on the lower pressure side of the membrane which is removed from the lower pressure region as permeate. Gas depleted in the selectively permeating gaseous component(s) is obtained on the higher pressure side of the membrane which is removed from the higher pressure region as non-permeate.

The separation process is carried out at pressures and temperatures which do not deleteriously affect the membrane. Preferably, the pressure on the high pressure side of the membrane is between about 25 psig (about 172.4 kPa) and about 1000 psig (about 6894.8 kPa), more preferably between about 50 psig (about 344.7 kPa) and about 500 psig (about 3447.4 kPa). The temperature of the feed gas mixture is preferably between about 0 and about 100° C., more preferably between about 5 and about 60° C., even more preferably between about 10 and about 50° C.

$$P = \frac{\text{(amount of permeant) (membrane thickness)}}{\text{(area) (time) (driving force across the membrane)}}.$$

A standard permeability measurement unit is the Barrer (Ba), which is equal to $$1 \times 10^{-10} \frac{\text{(centimeter}^3 \text{ (STP)) (centimeter)}}{\text{(centimeter)}^2 \text{ (second) (centimeter Hg)}},$$

abbreviated hereinafter as $$1 \times 10^{-10} \frac{cm^3 \text{ (STP) cm}}{cm^2 \text{ s cmHg}}.$$

The reduced gas flux is defined as (permeability)÷(membrane thickness). A standard reduced flux unit is $$1 \times 10^{-6} \frac{\text{(centimeter)}^3 \text{ (STP)}}{\text{(centimeter)}^2 \text{ (second) (centimeter Hg)}},$$

abbreviated hereinafter as $$1 \times 10^{-6} \frac{cm^3 \text{ (STP)}}{cm^2 \text{ s cmHg}}.$$

The gas separation factor (selectivity) is defined as the ration of the permeability or flux of the faster permeating gas to the permeability or flux of the slower permeating gas.

The membranes of this invention are particularly useful for separating at least one gaseous component from other gaseous components in a gas mixture. The gas mixture preferably contains at least one gas selected form the group consisting of hydrogen, helium, oxygen, nitrogen, carbon monoxide, carbon dioxide, water vapor, hydrogen sulfide, ammonia, and light hydrocarbons. As used herein, the term light hydrocarbons refers to gaseous saturated and unsaturated $C_{1-4}$ hydrocarbons such as methane, ethane, ethylene, propane, propylene, butane, and butylene.

The membranes of this invention preferably possess a separation factor at about 30° C. for helium/methane of at least about 45, more preferably of at least about 60. The membranes of this invention preferably possess a separation factor at about 30° C. for helium/ethylene of at least about 55, more preferably of at least about 70. The membranes of this invention preferably possess a separation factor at about 30° C. for carbon dioxide/methane of at least about 20. the membranes of this invention preferably possess a separation factor at about 30° C. for oxygen/nitrogen of at least about 4.4, more preferably of at least about 5.6.

The membranes preferably possess a reduced gas flux for helium of at least about $$4.7 \times 10^{-7} \frac{cm^3 \text{ (STP)}}{cm^2 \text{ s cmHg}},$$

more preferably of at least about $$9.4 \times 10^{-7} \frac{cm^3 \text{ (STP)}}{cm^2 \text{ s cmHg}}.$$

The membranes preferably possess a reduced gas flux for oxygen of at least about $$3.9 \times 10^{-8} \frac{cm^3 \text{ (STP)}}{cm^2 \text{ s cmHg}},$$

more preferably of at least about $$7.9 \times 10^{-8} \frac{cm^3 \text{ (STP)}}{cm^2 \text{ s cmHg}}.$$

The membranes preferably possess a reduced gas flux for carbon dioxide of at least about $$1.6 \times 10^{-7} \frac{cm^3 \text{ (STP)}}{cm^2 \text{ sec cmHg}}.$$

The membrane separation process of this invention may be combined with non-membrane separation processes such as cryogenic distillation (low temperature distillation) and pressure swing adsorption.

SPECIFIC EMBODIMENTS

The following example is included for illustrative purposes only and are not intended to limit the scope of the invention or claims.

EXAMPLE 1

About 3.00 grams ketimine and about 2.33 grams bisphenol A in about 22 milliliters N-methyl-2-pyrrolidinone, about 11 milliliters toluene, and about 2.00 grams anhydrous potassium carbonate are transferred to a 250 milliliter three neck flask fitted with a nitrogen inlet, thermometer, overhead stirrer, Dean Stark trap, condenser, drying tube, and silicone heating bath. The Dean Stark strap is filled to within about 5 milliliters of its capacity with toluene. The reactants are stirred at about 160° C. and the toluene allowed to reflux for about 3 hours to dehydrate the system during phenate formation. The toluene is then removed and the mixture hated to about 170° C. for about 14 hours. The reactant solution is cooled slightly, diluted with N-methyl-2-pyrrolidinone to about 10 weight percent solids, filtered, and acidified with acetic acid. The polymer is isolated via precipitation into a solution of methanol/water. The polymer is then stirred in about 700 milliliters of water at about 95° C. for about 12 hours to remove remaining salts. The polymer is then refiltered, washed with methanol, and dried under vacuum at about 100° C. overnight.

A thin film is prepared by casting onto a glass plate a solution containing about 0.3 grams of polymer in about 2.7 milliliters of tetrahydrofuran. The film is vacuum stripped at about 120° C. for about 8 hours prior to evaluating for gas separation performance by the constant-volume, variable pressure method. Structure determination via FTIR indicates the presence of the imine moiety and the absence of carbonyl functionality. Gas separation data are reported in Table I. For a description of the constant-volume variable-pressure gas permeability test method, see Pye, Hoehn, and Panar, "Measurement of Gas Permeability of Polymers. I. Permeabilities in Constant-Volume/Variable Pressure Apparatus," *Journal of Applied Polymer Science*, Vol. 20, 1976, pp. 1921-1931, the relevant portions relating to gas permeability measurement incorporated herein by reference. Data are reported in Table I.

TABLE I

| PERMEABILITY (BARRERS) | SEPARATION FACTOR | | |
|---|---|---|---|
| $\frac{He}{9.45}$ | $\frac{He/CH_4}{64.3}$ | $\frac{He/N_2}{75.6}$ | $\frac{He/C_2H_4}{80.7}$ |
| $\frac{O_2}{0.79}$ | $\frac{O_2/N_2}{6.31}$ | | |
| $\frac{CO_2}{3.2}$ | $\frac{CO_2/CH_4}{21.6}$ | | |

What is claimed is:

1. A process of separating gases comprising:
   A. contacting one side of a semi-permeable gas separation membrane with a feed gas mixture under pressure, wherein the membrane separates a higher pressure region on one side of the membrane into which the feed gas mixture is fed from a lower pressure region on the other side of ht membrane;
   B. maintaining a pressure differential across the membrane under conditions such that at least one gaseous component in the feed gas mixture selectively permeates through the membrane from the higher pressure region to the lower pressure region;
   C. removing from the lower pressure region permeated gas which is enriched in the selectively permeating gaseous component(s); and
   D. removing form the higher pressure region non-permeated gas which is depleted in the selectively permeating gaseous component(s);

wherein the membrane comprises a thin discriminating layer of a poly(arylene ether ketimine).

2. The process of claim 1, wherein the feed gas mixture contains at least one of the gases selected from the group consisting of hydrogen, helium, oxygen, nitrogen, carbon monoxide, carbon dioxide, water vapor, hydrogen sulfide, ammonia, and light hydrocarbons.

3. The process of claim 2 wherein the pressure of the feed gas mixture is between about 25 and about 1000 psig.

4. The process of claim 3 wherein the temperature of the feed gas mixture is between about 0° and about 100° C.

* * * * *